US009692774B2

(12) United States Patent
Lapsley et al.

(10) Patent No.: US 9,692,774 B2
(45) Date of Patent: Jun. 27, 2017

(54) REAL-TIME NETWORK ATTACK DETECTION AND MITIGATION INFRASTRUCTURE

(71) Applicant: Sonus Networks, Inc., Westford, MA (US)

(72) Inventors: David Lapsley, North Andover, MA (US); Miri Mansur, Sugar Land, TX (US); Jonathan Klotzbach, Cocoa, FL (US); Ti-yuan Dean Shu, Andover, MA (US); Sri Chary, Westford, MA (US); Joby Joseph, Nashua, NH (US); Mark Topham, Andover, MA (US); Wassim Matragi, North Andover, MA (US); Kenneth Dumble, Andover, MA (US)

(73) Assignee: SONUS NETWORKS, INC., Westford, MA (US)

( * ) Notice: Subject to any disclaimer, the term of this patent is extended or adjusted under 35 U.S.C. 154(b) by 0 days.

(21) Appl. No.: 15/059,699

(22) Filed: Mar. 3, 2016

(65) Prior Publication Data

US 2016/0182547 A1    Jun. 23, 2016

Related U.S. Application Data

(62) Division of application No. 14/242,758, filed on Apr. 1, 2014, now Pat. No. 9,332,026, which is a division
(Continued)

(51) Int. Cl.
*G08B 23/00* (2006.01)
*H04L 29/06* (2006.01)

(52) U.S. Cl.
CPC .......... *H04L 63/1416* (2013.01); *H04L 63/08* (2013.01); *H04L 63/1441* (2013.01)

(58) Field of Classification Search
CPC ............... H04L 63/145; H04L 63/1408; H04L 63/1416; H04L 63/1441; H04L 63/1458; H04L 1/0026; H04N 5/357; H04B 17/336
See application file for complete search history.

(56) References Cited

U.S. PATENT DOCUMENTS 5,809,459 A * 9/1998 Bergstrom ............ G10L 19/125
704/218
6,289,313 B1 * 9/2001 Heinonen ............... G10L 17/26
600/301
(Continued)

*Primary Examiner* — Shewaye Gelagay
*Assistant Examiner* — Khoi Le
(74) *Attorney, Agent, or Firm* — Stephen T. Straub; Ronald P. Straub; Michael P. Straub

(57) ABSTRACT

The invention features systems and methods for detecting and mitigating network attacks in a Voice-Over-IP (VoIP) network. A server is configured to receive information related to a mitigation action for a call. The information can include a complexity level for administering an audio challenge-response test to the call and an identification of the call. The server also generates i) a routing label based on the identification of the call, and ii) a script defining a plurality of variables that store identifications of a plurality of altered sound files for the audio challenge-response test. Each altered sound file is randomly selected by the server subject to one or more constraints associated with the complexity level. The server is further configured to transmit the script to a guardian module and the routing label to a gateway.

13 Claims, 4 Drawing Sheets

Related U.S. Application Data of application No. 13/271,928, filed on Oct. 12, 2011, now Pat. No. 8,719,930.

(60) Provisional application No. 61/392,384, filed on Oct. 12, 2010.

(56) References Cited

U.S. PATENT DOCUMENTS

| | | | | |
|---|---|---|---|---|
| 7,627,050 B2* | 12/2009 | Kim | .................... | H04B 7/0626 375/259 |
| 2002/0059063 A1* | 5/2002 | Tsutsui | ................. | G10L 19/167 704/210 |
| 2004/0222866 A1* | 11/2004 | Stengel | ................. | H03K 5/131 332/109 |
| 2007/0121596 A1* | 5/2007 | Kurapati | ........... | H04L 29/06027 370/356 |
| 2007/0208566 A1* | 9/2007 | En-Najjary | ........... | G10L 13/033 704/269 |
| 2007/0280369 A1* | 12/2007 | Reynolds | ............. | H04B 5/0062 375/267 |
| 2009/0144036 A1* | 6/2009 | Jorgensen | ........... | H04R 29/001 703/6 |
| 2010/0211372 A1* | 8/2010 | Troedsson | ............... | G06G 7/62 703/13 |

* cited by examiner

REAL-TIME NETWORK ATTACK DETECTION AND MITIGATION INFRASTRUCTURE

CROSS REFERENCE TO RELATED APPLICATIONS

The present application is a divisional of U.S. patent application Ser. No. 14/242,758 filed Apr. 1, 2014, which is hereby expressly incorporated by reference and which is a divisional of U.S. patent application Ser. No. 13/271,928 filed Oct. 12, 2011 now issued U.S. Pat. No. 8,719,930, which is hereby expressly incorporated by reference in its entirety and which claims the benefit of and priority to U.S. Provisional Application Ser. No. 61/392,384 filed Oct. 12, 2010, which is owned by the assignee of the instant application and the disclosure of which is also incorporated herein by reference in its entirety.

FIELD OF THE INVENTION

The invention relates generally to detecting and mitigating network attacks in a Voice over Internet Protocol (VoIP) network, and more particularly to processing rules to detect anomalies and applying the Completely Automated Public Turing Test to Tell Computers and Humans Apart (CAPTCHA) in a VoIP network.

BACKGROUND OF THE INVENTION

Network or cyber-security is an important national priority and of great importance to customers of networking products. Given the dependence of the United States on the Internet, and networking in general, there is a considerable effort to ensure that a networking infrastructure is adequately protected from attacks. In recent times, some large companies have experienced significant Distributed Denial of Service (DDoS) attacks against their VoIP infrastructure and have been aggressively pursuing solutions that can help them to detect and mitigate these attacks in near real-time.

SUMMARY OF THE INVENTION

The invention provides a comprehensive, automated attack-avoidance solution including call monitoring, diversion of suspicious calls and application of audio challenge-response tests to suspicious calls in addition to other mitigation actions.

In one aspect, the invention features a method of detecting and mitigating network attacks in a VoIP network. The method includes receiving, by a server, information related to a mitigation action for a call. The mitigation action is generated by an analyzer based on detecting a possible attack by the call. The information related to the mitigation action includes a complexity level for administering an audio challenge-response test to the call and an identification of the call. The method also includes generating, by the server, a script including variables for identifying a plurality of altered sound files for the audio challenge-response test. The method includes assigning, by the server, a routing label to the call. The routing label includes one or more parameters for configuring the variables of the script according to the complexity level. The method further includes transmitting, by the server, the script and the routing label to the guardian module. The guardian module is adapted to define the variables of the script to identify the plurality of altered sound files for the audio challenge-response test. Each altered sound file is randomly selected by the guardian module subject to the parameters of the routing label. The guardian module is adapted to administer the audio challenge-response test to the call based on the script.

In another aspect, the invention features a system for detecting and mitigating network attacks in a VoIP network. The system includes an analyzer that includes a detection module for detecting a possible attack corresponding to a call. The analyzer also includes a rules engine for determining a mitigation action to avoid the possible attack. The mitigation action provisions an audio challenge-response test for the call. The analyzer further includes a policy change engine for forwarding information about the mitigation action to one or more modules of the system. The information about the mitigation action includes a complexity level for administering the audio challenge-response test and an identification of the call. The system further includes a server for receiving the information from the policy change engine. The server is adapted to generate a script including variables for identifying a plurality of altered sound files for the audio challenge-response test. The server is also adapted to assign a routing label to the call. The routing label includes one or more parameters for configuring the variables of the script according to the complexity level. The system includes a guardian module for receiving the script and the routing label from the server. The guardian module is adapted to define the variables of the generic script to identify the plurality of altered sound files for the challenge-response test and administer the audio challenge-response test to the call based on the script. Each altered sound file is randomly selected by the guardian module subject to the parameters of the routing label.

In another aspect, the invention features a computer program product, tangibly embodied in a computer readable medium, for detecting and mitigating network attacks in a VoIP network. The computer program product includes instructions being operable to cause data processing apparatus to receive information related to a mitigation action for a call. The mitigation action is generated by an analyzer based on detecting a possible attack by the call. The information related to the mitigation action can include a complexity level for administering an audio challenge-response test to the call and an identification of the call. The computer program product also includes instructions being operable to cause data processing apparatus to generate a script including variables for identifying a plurality of altered sound files for the audio challenge-response test and assign a routing label to the call. The routing label includes one or more parameters for configuring the variables of the script according to the complexity level. The computer program product also includes instructions being operable to cause data processing apparatus to transmit the script and the routing label to a guardian module. The guardian module is adapted to i) define the variables of the script to identify the plurality of altered sound files for the audio challenge-response test, and ii) administer the audio challenge-response test to the call based on the script. Each altered sound file is randomly selected by the guardian module subject to the parameters of the routing label.

In various embodiments, the guardian module administers the audio challenge-response test by retrieving the altered sound files from a storage area during runtime of the audio challenge-response test based on the variables of the script defined by the guardian module. The guardian module proceeds to play the altered sound files in a sequence defined by the variables.

In various embodiments, the audio challenge-response test includes a sequence of the altered sound files, which includes one or more altered digit files and one or more inter-digit noise files. Each altered digit file is a combination of clear voice sound of a digit and an amount of background noise added according to a signal-to-noise ratio corresponding to the complexity level. Each inter-digit noise file provides a variable spacing, in the form of noise, between digits.

In various embodiments, the one or more parameters of the routing label includes a minimum number of digits in the audio challenge-response test for the complexity level, a maximum number of digits in the audio challenge-response test for the complexity level, a signal-to-noise ratio for the complexity level, a minimum inter-digit delay for the complexity level and a maximum inter-digit delay for the complexity level.

In various embodiments, a gateway of the system returns the call to its regular path if the call passes the audio challenge-response test. However, the gateway executes a final treatment if the call fails the audio challenge-response test. The final treatment includes at least one of terminating the call, recording the call, diverting the call to an operator, replaying the audio challenge-response test, or providing a second audio challenge-response test.

In various embodiments, the analyzer generates the altered sound files from a library of original sound files storing unaltered sounds. The analyzer also generates a mapping of the identifications of the altered sound files to their respective complexity levels. The analyzer can further upload the altered sound files and the mapping to at least one of the guardian module and the server.

In various embodiments, the script includes additional variables that are customizable by the guardian module for the audio challenge-response test. The additional variables include: a variable storing an identification of a greeting message to be played before the audio challenge-response test, a variable defining a number of times for replaying the audio challenge-response test, a variable defining a number of times a caller of the call is allowed to skip the audio challenge-response test and advance to a new audio challenge-response test, and a variable for specifying a final treatment if the caller fails the audio challenge-response test.

In another aspect, the invention features a method of generating an altered sound file for a digit that corresponds to a number or a letter. The method includes receiving a complexity level and an input audio file that is the original clear voice sound of the digit. The method includes converting data in the input audio file into normalized digit data, generating normalized background noise using a noise generation algorithm, and adding the normalized background noise to the normalized digit data to generate combined data. The amount of background noise added is based on the complexity level. In addition, one or more random bits of silence can be added to the combined data. The method further includes de-normalizing the combined data to produce the altered sound file for the digit.

In another aspect, the invention features a computer program product, tangibly embodied in a computer readable medium, for generating an altered sound file for a digit that corresponds to a number or a letter. The computer program product includes instructions being operable to cause data processing apparatus to receive a complexity level and an input audio file comprising original clear voice sound of the digit, convert data in the input audio file into normalized digit data, generate normalized background noise using a noise generation algorithm, and add the normalized background noise to the normalized digit data to generate combined data. The amount of background noise added is based on the complexity level. In addition, the computer program product includes instructions being operable to cause data processing apparatus to de-normalize the combined data to produce the altered sound file for the digit.

In various embodiments, the normalized digit data comprises normalized linear pulse-code modulation data. The noise generation algorithm produces at least one of additive white Gaussian noise or pre-recorded background noise. The amount of background noise added is based on a signal-to-noise ratio defined for the complexity level.

In another aspect, the invention features a method of generating an inter-digit noise file. The method includes generating normalized background noise using a noise generation algorithm, adding one or more random bits of silence to the normalized background noise, adding one or more random bits of amplitude variation to the normalized background noise, and de-normalizing the normalized background noise to produce the inter-digit noise file.

In another aspect, the invention features a computer program product, tangibly embodied in a computer readable medium, for generating an inter-digit noise file. The computer program product includes instructions being operable to cause data processing apparatus to generate normalized background noise using a noise generation algorithm, add one or more random bits of silence to the normalized background noise, add one or more random bits of amplitude variation to the normalized background noise and de-normalize the normalized background noise to produce the inter-digit noise file.

In yet another aspect, the invention features a method of detecting and mitigating network attacks in a VoIP network. The method includes maintaining, by a detection module, a plurality of adaptable profiles that capture statistical and behavioral properties of call detail records (CDRs) associated with a plurality of received calls. The method includes maintaining, by the detection module, a plurality of reference profiles that reflect normal call behavior corresponding to the plurality of adaptable profiles. The method also includes updating, by the detection module, an adaptable profile from the plurality of adaptable profiles based on a CDR of an incoming call. The method further includes comparing, by the detection module, the updated adaptable profile with a corresponding reference profile from the plurality of reference profiles and determining, by the detection module, if an anomaly exists based on the comparing using multivariate analysis. The detection module generates an alarm corresponding to the incoming call indicative of the network attack if the anomaly is detected.

In another aspect, the invention features a detection module for detecting and mitigating network attacks in a VoIP network. The detection module includes a database for maintaining: i) a plurality of adaptable profiles that capture statistical and behavioral properties of call detail records (CDRs) associated with a plurality of received calls, and ii) a plurality of reference profiles that reflect normal call behavior corresponding to the plurality of adaptable profiles. The detection module also includes a profile unit for updating an adaptable profile from the plurality of adaptable profiles based on a CDR of an incoming call. The detection module further includes a detector unit for comparing the updated adaptable profile with a corresponding reference profile from the plurality of reference profiles, determining if an anomaly exists based on the comparing using multivariate analysis, and generating an alarm corresponding to the incoming call indicative of the network attack if the anomaly is detected.

In another aspect, the invention features a computer program product, tangibly embodied in a computer readable medium, for detecting and mitigating network attacks in a VoIP network. The computer program product includes instructions being operable to cause data processing apparatus to maintain a plurality of adaptable profiles that capture statistical and behavioral properties of call detail records (CDRs) associated with a plurality of received calls and maintain a plurality of reference profiles that reflect normal call behavior corresponding to the plurality of adaptable profiles. The computer program product includes instructions being operable to cause data processing apparatus to update an adaptable profile from the plurality of adaptable profiles based on a CDR of an incoming call, compare the updated adaptable profile with a corresponding reference profile from the plurality of reference profiles; and determine if an anomaly exists based on the comparing using multivariate analysis. The computer program product further includes instructions being operable to cause data processing apparatus to generate an alarm corresponding to the incoming call indicative of the network attack if the anomaly is detected.

In various embodiments, the detection module can forward the alarm to a rules engine for determining a mitigation action for the incoming call if the anomaly is detected. The mitigation action can include rerouting the incoming call to a guardian module to receive an audio challenge-response test. A complexity level of the test is determined by the guardian module based on the alarm.

In various embodiments, determining if a profile is anomalous further includes computing a distance between the adaptable profile and the reference profile and determining if the difference exceeds a threshold.

In various embodiments, determining the adaptable profile from the plurality of adaptable profiles includes determining a calling number of the incoming call, locating one or more received calls from the plurality of received calls with the same calling number, and selecting the adaptable file, created for the one or more received calls, from the plurality of adaptable profiles.

Other aspects and advantages of the invention will become apparent from the following drawings and description, all of which illustrate principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
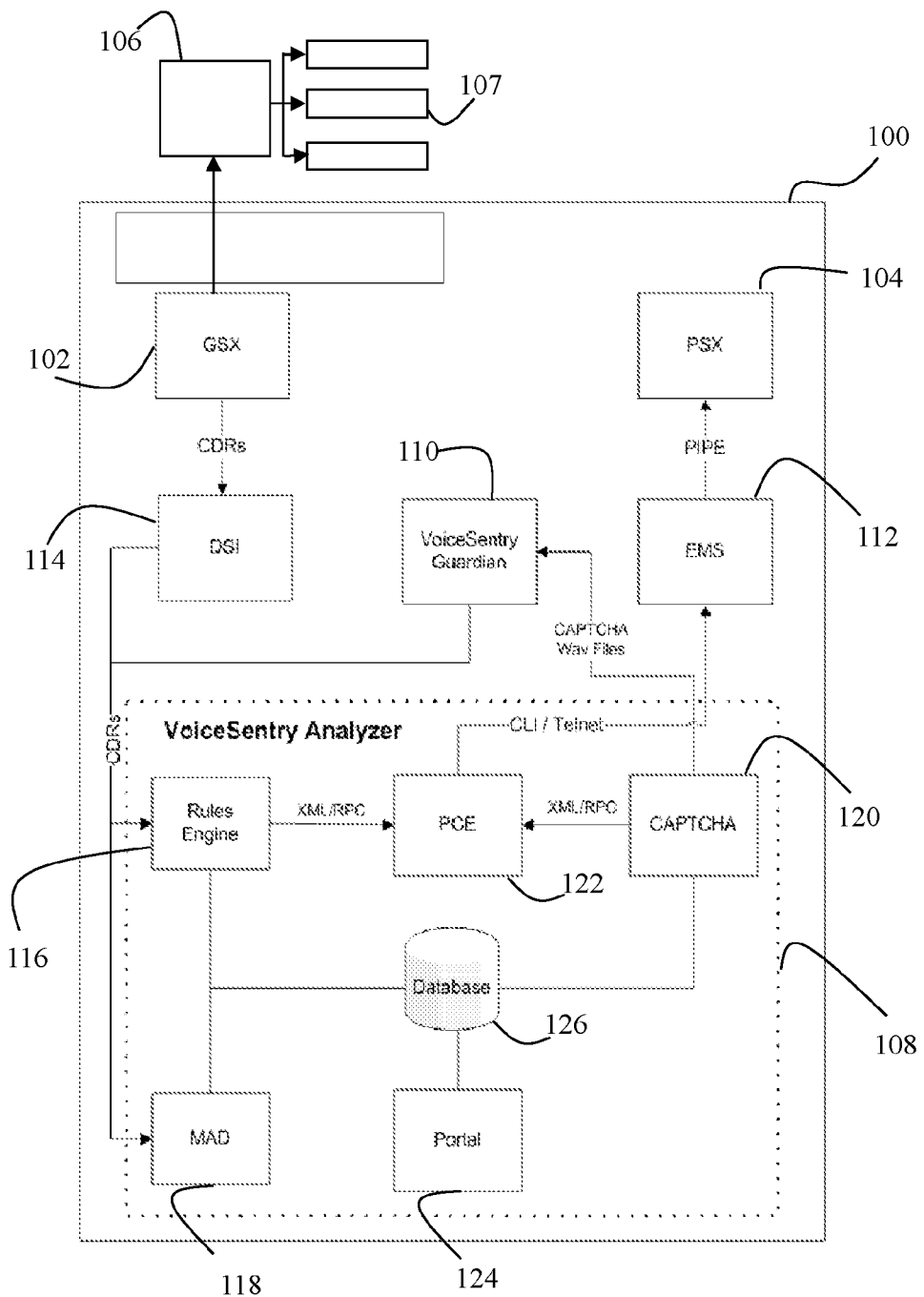
FIG. 1 shows an exemplary system for detecting and mitigating network attacks.

FIG. 1 shows an exemplary system 100 for detecting and mitigating network attacks. The system 100 includes a gateway 102, a policy server 104, an Element Management System (EMS) module 112, a Data Stream Integrator (DSI) module 114, a guardian module 110 and an analyzer 108.

In a normal operation, after the gateway 102 receives an ingress call, the policy server 104 determines which call manager 106 to route the call. Exemplary call managers 106 include an Interactive Voice Response (IVR) and an Automatic Call Distributor (ACD). Based on the determination made by the policy server 104, the gateway 102 routes the call to the appropriate call manager 106, where the call is queued and eventually answered by an agent 107, who can be a human operator.

The analyzer 108 of the system 100 is configured to detect a possible network attack in an incoming call and determine one or more mitigation actions in response to a possible attack. Exemplary mitigation actions include terminating the incoming call, recording the incoming call, and/or diverting the incoming call to an operator for further investigation. Another exemplary mitigation action involves the gateway 102 re-routing the call to the guardian module 110 for audio challenge-response testing, such as presenting an audio CAPTCHA test to the caller. The test can be an obfuscated but comprehensible challenge (e.g., "Please type in the following digits: one, seven, and nine."). If the caller responds correctly to the challenge, the gateway 102 returns the call to its regular routing path and terminates the call at a desired destination via the appropriate call manager 106. If the caller answered incorrectly, however, one or more of the mitigation actions is applied to the call, including replaying the audio challenge-response test, or providing a second audio challenge-response test.

The gateway 102 can provide gateway functionalities for one or more calls and associated signaling. In addition, the gateway 102 can monitor and divert calls based on suspicious call activities. In some embodiments, the gateway 102 is a media gateway manufactured by the Sonus Networks, Inc., such as the GSX9000 device.

The policy server 104 can provide routing information services to other network elements. For example, the policy server 104 can coordinate with the gateway 102 to route incoming calls or re-route suspicious calls to specific locations, such as to the guardian module 110 to receive CAPTCHA challenges. Specifically, the policy server 104 can coordinate with the guardian module 110 to determine the appropriate CAPTCHA challenge to administer to a caller. In some embodiments, the policy server 104 can be configured by the analyzer 108 via the EMS module 112, such as through a command-line interface (CLI) of the EMS module 112. In some embodiments, the policy sever 104 is a soft switch manufactured by the Sonus Networks, Inc.

The DSI module 114 can provide file system services to the gateway 102. For example, the DSI module 114 can store Call Detail Records (CDRs) associated with ingress calls. These records can be used by the analyzer 108 to detect incoming DoS attacks. In some embodiments, the signaling protocol of an ingress call provides sufficient signaling parameters to enable anomaly detection by the analyzer 108. The signaling protocols can be in the form of integrated services digital network (ISDN) signaling, channel association signaling (CAS), or session initiation protocol (SIP), for example. The signaling parameters of an ingress call can be written to one or more fields of a CDR corresponding to the call. In some embodiments, a single CDR is created for each ingress call. In some embodiments, a CDR is created for each of the multiple legs of an ingress call. In this case, the system 100 can correlate the individual CDRs to each uniquely identifiable call. These CDRs can be represented by a p-charging vector in the DSI module 114.

The guardian module 110 can be a network border switch for administering CAPTCHA functionalities to incoming calls and diverting one or more of the calls based on the CAPTCHA result. In some embodiments, the guardian module 110 is a ConnexIP-based platform manufactured by the Sonus Networks, Inc.

The analyzer 108 can be configured to detect possible DoS attacks and provide mitigation actions in response to the detection. In some embodiments, the analyzer 108 is implemented on an Intel-based Sun or Oracle X4250 server. The analyzer 108 can include a Multivariate Anomaly Detection (MAD) module 118 for performing real-time or near real-time anomaly detection based on CDRs of incoming calls. The analyzer 108 can include a rules engine 116 for providing attack impact assessment and recommending one or more mitigation actions. The analyzer 108 can include a CAPTCHA module 120 for generating CAPTCHA files according to user specified complexity and/or configuration metrics. The CAPTCHA module 120 can also refresh and update the CAPTCHA files as appropriate. The analyzer 108 can include a Policy Change Engine (PCE) 122 for use by the rules engine 116 and the CAPTCHA module 120 to make updates to routing policies in the policy server 104 and/or configuration settings in the EMS module 112. In addition, the analyzer 108 can include a portal 124, which can be an interactive graphical user interface (GUI) that provides an operator with configuration data, status information, reports and the like. The analyzer 108 can further include a database 126 in communication with at least one of the MAD module 118, the rules engine 116, the portal 124, the CAPTCHA module 120 and the PCE 122 for storing data required by these modules. In addition, these modules can read information from the database 126 using, for example, a polling and/or change notification mechanism.

In various embodiments, the gateway 102, the policy server 104, the guardian module 110 and the analyzer 108 are appropriately sized so that an ingress call can be intercepted and analyzed for attack detection and, if necessary, correction. The system 100 can be deployable as a stand-alone application located at each POP (Point of Presence) or as a part of a larger network system.

The MAD Module

The MAD module 118 of the analyzer 108 includes a configurable profile unit (not shown) for creating, maintaining, and updating one or more call profiles in near real-time and a detector unit (not shown) for detecting anomalous calls.

In particular, the profile unit creates one or more adaptable profiles, each profile providing a measure of statistical behavior of a set of CDRs over a period of time. In some embodiments, information used by the profile unit to compile an adaptable profile is parsed from one or more configurable fields of CDRs associated with a group of ingress calls. For example, an adaptable profile can be compiled and/or updated based on the information parsed from one or more fields of STOP or ATTEMPT CDRs, which can provide call information such as the calling numbers, the called numbers and the gateway identifications of the corresponding calls. In some embodiments, an adaptable profile can be created from a group of CDRs sharing a unique call feature, such as a calling number. Other unique call features for grouping the CDRs for the purpose of creating adaptable profiles include ingress or egress trunk group, routing label, calling party category, billing number, originating line information parameter (OLIP), local access and transport area (LATA), and call direction. Each adaptable profile can provide statistical properties of all the pertinent CDRs. For example, each adaptable profile can include one or more counters tracking the number of calls made or attempted as well as duration, time of day, and/or day of week of the calls. In some embodiments, the profile unit creates one or more adaptable profiles based on information provided by a configuration file, which can be supplied to the MAD module 118 from an operator via the portal 124. The configuration file can specify feature(s) for grouping the CDRs for the purpose of creating adaptable profiles and different statistical properties that can be monitored by the profiles. In some embodiments, the profile unit creates and maintains a global profile that keeps track of all calls and attempts processed by the MAD module 118. The adaptable profiles and the global profile are periodically or continuously updated over time as the MAD module 118 processes more incoming calls.

In some embodiments, the profile unit also maintains a set of reference profiles corresponding to the adaptable profiles or the global profile. These reference profiles are standard profiles representative of normal behavior for the adaptable profiles or the global profile. The reference profiles can be obtained using any analytical algorithm, such as machine learning approaches based on clustering or data analysis by a subject matter expert.

The detector unit of the MAD module 118 is able to detect in near real-time any anomalous behavior in an adaptable profile or the global profile as the profile is updated based on CDRs of pertinent incoming calls. The detector unit accomplishes this by periodically or continuously watching for changes in the adaptable profiles or the global profile and comparing the changed profile(s) against their corresponding reference profile(s) using a multivariate anomaly detection technique. According to an exemplary multivariate anomaly detection approach, if a Canberra or Euclidean distance calculated between an adaptable or global profile and its reference profile is too great (e.g., exceeds a specified threshold), the adaptable or global profile is declared anomalous by the detector unit, and an event is triggered and forwarded to the rules engine 116 for further processing. The event can include information about the adaptable or global profile that triggered the event, the corresponding reference profile(s), and/or the distance measurement.

In some embodiments, the adaptable, global and/or reference profiles are stored in one or more local in-memory caches of the MAD module 118. In the case that the number of profiles stored in the cache reaches a certain threshold, the MAD module 118 can move the least recently used profiles to the database 126 for longer term storage. In general, the database 126 may store all or a portion of the profiles generated by the MAD module 118.

In some embodiments, a call center agent 107 has the ability to flag or mark a call as "bad" or "attacked" after the call has been routed through a call manager 106. In response, the system 100 triggers a marking event via a call transfer that is processed by the call manager 106 or via another suitable method. The marking event is written into the CDR corresponding to the call. Any field in the CDR can be edited to reflect the marking event so long as the altered fields can uniquely identify the marked call. This functionality facilitates the identification and classification of attack patterns as well as maintenance of CAPTCHA statistics by the MAD module 118.

The Rules Engine

The rules engine 116, upon receiving an anomalous event notification from the MAD module 118, is configured to generate an alarm associated with the event, prioritize the alarm based on a set of rules, and determine an effective mitigation action. In some embodiments, the rules engine 116 automatically implements the mitigation action by sending a message to the PCE 122 to update pertinent routing elements described by the action. The PCE 122 can interact with the gateway 102, the guardian 110 and/or the policy server 104 (e.g., via the EMS module 112) to execute the action. In some embodiments, the rules engine 116 recommends the mitigation action to an operator, who can choose to manually implement the action by sending a message to the PCE 122.

In general, the rules engine 116 can receive one or more sets of rules from a variety of sources. The rules can be specified in a file of a suitable format, such as in a Drools Rule Language (drl) format associated with a .drl configuration file. In an exemplary implementation, the rules engine 116 receives two types of rules—one type of rules maps an incoming alarm event from the MAD module 118 to a mitigation action, and the second type of rules tracks the impact of a mitigation action and adjusts the mitigation strategy accordingly, such as implementing a different mitigation action if the previous action is ineffective. To track the impact of a mitigation action, the rules engine 116 can monitor, for example, anomaly rates after the action has been implemented. Exemplary mitigation actions include terminating a suspicious call, recording the call, diverting the call to an operator for further investigation or administering a CAPTCHA test to the caller. If the caller fails a CAPTCHA test, the rules engine 116 can provision for the implementation of another mitigation action, such as replaying the same CAPTCHA test or play a different CAPTCHA test.

The rules engine 116 can use an event-processing system to apply the input rules against an input stream of events and generate a set of actions corresponding to the stream of events. In one example, the rules engine 116 uses the Redhat JBoss Drools technology to implement event processing because the Drools technology provides a flexible, modular, and extensible way of implementing sophisticated matching logics. If the Drools technology is used, the rules can be parameterized and written in a specialized "drools" language format that combines predicate logic with java code. In addition, the rules engine 116 can send messages to a variety of receivers to broadcast appropriate mitigation actions for the alarms, including to the PCE 122.

In some embodiments, the rules engine 116 stores one or more of the rules or related data in the database 126 and reads data from the database 126 as needed. In some embodiments, the rules engine 116 receives one or more operator-initiated events or messages from the portal 124 and acts on these events or messages accordingly, including implementing an operator-approved mitigation action.

The Portal

The portal 124 can provide an interactive GUI that allows an operator to filter and correlate information processed by various components of the analyzer 108, thereby reducing the cognitive load on the operator. For example, the portal 124 can include interactive and configurable charts plotting key system metrics in real-time or near real-time. The portal 124 can also include an alarms management facility allowing an operator to filter and view alarms generated by the MAD module 118 or the mitigation actions generated by the rules engine 116. In addition, the portal 124 can make available to an operator network topology and application configuration information.

In some embodiments, the portal 124 can communicate with other components of the analyzer 108, including the rules engine 116, the MAD module 118, the PCE 122 and the CAPTCHA module 120, to obtain certain data and present the data via the portal interface.

In some embodiments, an operator can use the portal 124 to asynchronously inject alarm events into the rules engine 116 for triggering mitigation actions. An operator can also use the portal 124 to provide configuration parameters for the various modules of the system 100.

The PCE

The PCE 122 can update network routing policies of a particular call in real-time or near real-time. Specifically, it can facilitate attack mitigation by receiving mitigation instructions associated with a call from the rules engine 116, the portal 124 or the CAPTCHA module 120. In response, the PCE 122 can update routing policies in the policy server 104 as provided by the mitigation instructions.

In some embodiments, the PCE 122 interacts with the policy server 104 via the EMS module 112 to implement routing updates for a call. For example, the PCE 122 sends routing commands to the EMS module 112 using an appropriate communications protocol, such as the telnet protocol. The EMS module 112 then forwards the commands to the policy server 104 using an appropriate communications protocol, such as the PIPE protocol.

The CAPTCHA Module

In general, administering a CAPTCHA test to a caller involves executing a CAPTCHA script that references a sequence of randomly spoken letters and/or numbers (referred herein as "digits"), where each digit is distorted with a varying level of background noise. The caller's ability to provide a correct response after the sequence is played, such as by pressing the appropriate keys on the calling device, assists the system 100 in determining whether the caller is human or a program.

To this end, the CAPTCHA module 120 can store one or more original sound files, which serve as the raw material for generating CAPTCHA tests. Each of the original sound files provides a clear voice sound of a digit (e.g., a number or letter) or original noise sample. Based on the library of original sound files, the CAPTCHA module 120 can generate a library of altered sound files that can be selected for inclusion in a CAPTCHA test. Each altered sound file can have a varying level of background noise added in based on a desired complexity level. In addition, the CAPTCHA module 120 can upload the altered sound files to the guardian module 110 and refresh the uploaded files on a periodic basis.

In some embodiments, the CAPTCHA module 120 stores the original sound files on one or more local disks. The original sound files can also be stored in a remote database, such as the database 126. In some examples, the original sound files are organized under a single "data/original" directory that includes multiple sub-directories. Each sub-directory contains a library of original sound files of a particular type. For example, a "data/original/EnglishMale" directory can include recordings of digits vocalized by an English-speaking male. A property file can also be provided for each sub-directory to characterize the content of the sub-directory. For example, a property file can have the following format:

library.name: English Male
    filename1.wav.character: 1
    filename2.wav.character: 3
    filename3.wav.character: A
    background1.wav.character: ~.

The "library.name" field indicates that that the digits in the sub-directory are read by an English-speaking male. The "filename<#>.wav.character" field specifies the digit recorded in the corresponding file of the sub-directory. Thus, the filename1.wav file represents an audio recording of number 1, the filename2.wav file represents an audio recording of digit 3, and the filename3.wav file represents an audio recording of the letter A. The special character ~ is used to denote a background noise file.

Based on the library of original sound files, the CAPTCHA module 120 can generate a library of altered sound files. In some embodiments, an altered sound file can be an altered digit file, which includes a combination of clear voice sound of a digit and a certain amount of additive background noise. Both the clear voice digit sound and the background noise can be selected by the CAPTCHA module 120 from the library of original sound files. An altered digit file can be associated with a complexity level, which indicates the amount of background noise added to the clear voice digit sound. For example, the more background noise is added, the higher the complexity level. In some embodiments, an altered sound file is an inter-digit noise file for providing background noise between playback of two altered digit files. Sounds used to create the inter-digit noise can be selected by the CAPTCHA module 120 from the library of original sound files.

Figure 2A:
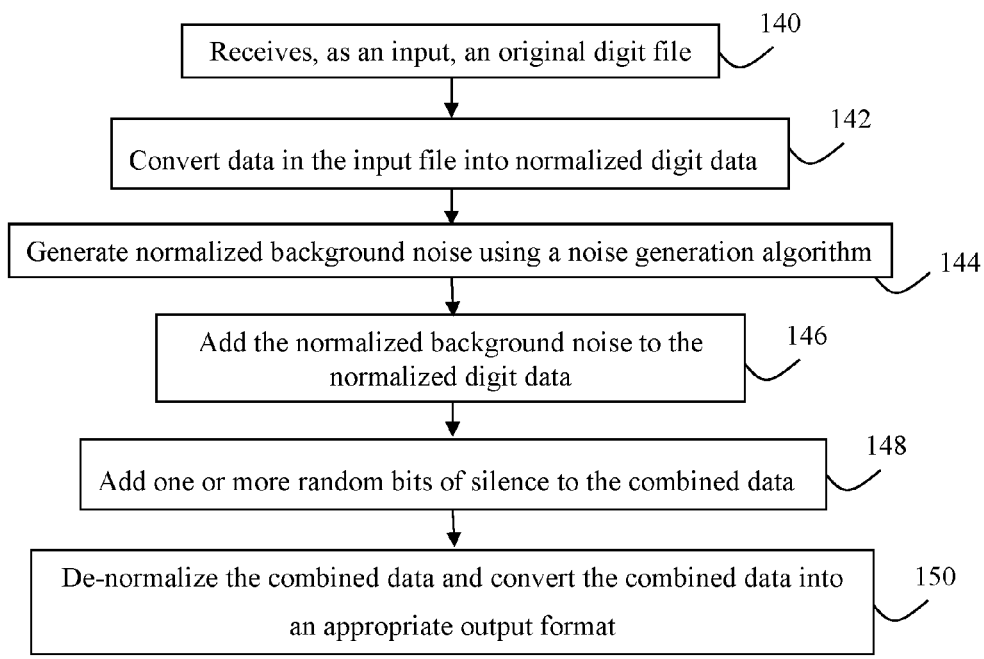
FIGS. 2a and 2b show exemplary processes for generating altered digit file and inter-digit noise file, respectively.

FIG. 2a shows an exemplary process of generating an altered digit file. The process starts when the CAPTCHA module 120 receives, as an input, an original sound file, which provides the clear voice sound of a digit (step 140). The input file can be stored in the library of original sound files readily accessible to the CAPTCHA module 120. In some embodiments, the CAPTCHA module 120 also receives a complexity level associated with the input sound file. The CAPTCHA module 120 proceeds to convert data in the input file into normalized digit data, such as linear and signed pulse-code modulation (PCM) data (step 142). The CAPTCHA module 120 also generates normalized background noise using a noise generation algorithm (step 144). The CAPTCHA module 120 then adds the normalized background noise to the normalized digit data by an amount determined by the input complexity level (step 146). The CAPTCHA module 120 can also add one or more random bits of silence to the combined data (step 148). The combined data is then de-normalized and converted into an appropriate output format (step 150).

Figure 2B:
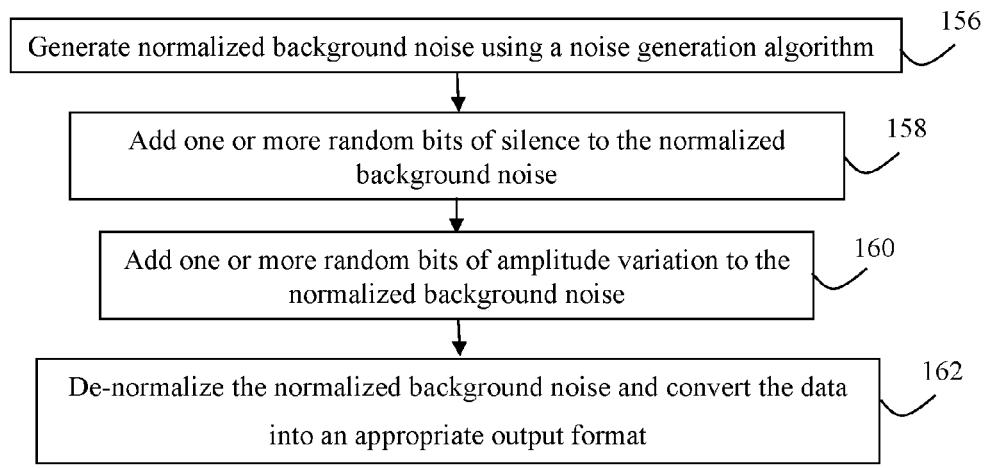

FIG. 2b shows an exemplary process of the CAPTCHA module 120 for generating an inter-digit noise file. The process starts when the CAPTCHA module 120 generates normalized background noise using a noise generation algorithm (step 156). The normalized background noise can constitute the primary linear PCM data. The CAPTCHA module 120 can also add one or more random bits of silence to the normalized background noise (step 158) as well as one or more random bits of amplitude variation to the normalized background noise (step 160). The resulting data is then de-normalized and converted into an appropriate output format (step 162).

The input file received by the process of FIG. 2a (at step 140) can have a variety of formats. For example, the input file can have any one of the following formats: WAV, AIFF and AU. In some embodiments, data encoded by the input file can be in a variety of formats including, but not limited to, G.711 A-law, G.711µ-law, PCM Linear (signed or unsigned). In addition, the input file format can support the following options: 1 or 2 frame size, an 8-bit or 16-bit sample size, 1 (mono) channel, a frame rate of 8000 frames per second, and a sample rate of 8000 samples per second.

One or more noise generation algorithms can be used by the CAPTCHA module 120 according to the processes of FIGS. 2a and 2b to produce background noise (at steps 144 and 156, respectively). Noise generation is thus used for creating both an altered digit file and an inter-digit noise file. In one exemplary approach, noise is generated as additive white Gaussian noise (AWGN). In another exemplary approach, noise is provided as pre-recorded background noise. The pre-recorded background noise file can be selected by the CAPTCHA module 120 from the library of original sound files. In some embodiments, the background noise file may be stored in the same sub-directory as the original sound file for the digit to which the noise is applied.

The process of FIG. 2a performs normalization of both an original digit file containing clean voice (CV) sound of a digit (at step 142) and normalization of background noise (BN) data (at step 144). In addition, the process of FIG. 2b performs normalization of BN data (at step 156). The following exemplary normalization algorithm can be used to produce normalized data with a power of 1. For example, the algorithm can be applied to CV data to produce normalized CV data (CV_normalized).

$$CV\_Power = \sum_{i=1}^{\#\_CV\,samples} \frac{CV[i]^2}{\#\_CV\_Samples}; \quad \text{(Equation 1)}$$

$$CV\_Normalized = \frac{CV}{\sqrt{CV\_Power}}. \quad \text{(Equation 2)}$$

The normalization algorithm can also be applied to BN data to produce normalized BN data (BN_Normalized).

$$BN\_Power = \sum_{i=1}^{\#\_BNsamples} \frac{BN[i]^2}{\#\_BN\_Samples}; \quad \text{(Equation 3)}$$

$$BN\_Normalized = \frac{BN}{\sqrt{BN\_Power}}. \quad \text{(Equation 4)}$$

The process of FIG. 2a also requires the addition of background noise to normalized digit data (at step 146). This makes it more difficult for automated systems to decode the CAPTCHA by, for example, applying a deCAPTCHA algorithm to recognize the digits in an audio CAPTHCA test. In some embodiments, the complexity level received by the process of FIG. 2a, which corresponds to a signal-to-noise ratio (SNR), is used to control the level of additive noise. Therefore, the higher the value of the SNR, the less noise is present in the altered digit file at the output. The following exemplary algorithm shows the addition of a specific amount of noise to normalized digit data, which represents normalized clear-voice sound of a digit (CV_Normalized). In particular, the amount of additive noise is computed based on a SNR and the normalized background noise (BN_Normalized).

$$CC = CV\_Normalized + \sqrt{\frac{1}{SNR} * BN\_normalized}, \quad \text{(Equation 1)}$$

The CV_normalized data can be determined using Equation 2 and the BN_Normalized data can be determined using Equation 4.

As shown in the processes of FIGS. 2a and 2b, the CAPTCHA module 120 can add one or more random bits of silence to an altered file, such as to an altered digit file (at step 148) and to an inter-digit noise file (at step 158). These periods of silence make it more difficult for deCAPTCHA programs to detect when a digit ends, thus when a digit has been played. However, the periods of silence do not impact an end user's audio experience.

To accomplish this, periods of silence are randomized. According to an exemplary algorithm, the CAPTCHA module 120 first selects a random value between a minimum non-silence length and a maximum non-silence length. The random value is used to determine the position in the altered sound file where silence can be inserted. The CAPTCHA module 120 then selects a second random value between a minimum silence length and a maximum silence length. This second random value represents the length of silence, such as in milliseconds, to be inserted at the determined position. These two steps are repeated until the end of the file is reached. Generally, having random periods of silence in a file is advantageous because, even though these brief periods are rarely discernable to human ears, they make it difficult for a deCAPTCHA program to discover the start and end of digits.

In various embodiments, the max non-silence length, which is the maximum length to wait before adding silence to audio data, can be selected from a range of 0 to 10,000 milliseconds, such as 800 milliseconds. The minimum silence length, which is the minimum length of silence to add to audio data, can be selected from a range of 0 to 5,000 milliseconds, such as 10 milliseconds. The maximum silence length, which is the maximum length of silence to add to audio data, can be selected from a range of 0 to 5,000 milliseconds, such as 20 milliseconds.

The process of FIG. 2b can add one or more random bits of amplitude variation to an inter-digit noise file (at step 158). For example, if the inter-digit noise file includes background noise, such as background noise of a restaurant or airport, the CAPTCHA module 120 can modify the amplitude of the noise with one or more bursts of sounds to simulate the same types of bursts natural to the sound of a digit. If such amplitude processing is not performed on an inter-digit noise file, a deCAPTCHA program can easily detect the inter-digit noise due to its lack of amplitude bursts. Therefore, by adding these bursts, the CAPTCHA module 120 makes it harder for a deCAPTCHA process to distinguish between the sound of an actual digit and inter-digit noise. In some embodiments, amplitude modification is also applied to digit sound files.

Different levels for boosting the amplitude of a sound file can be specified by an operator via the portal 124. Each boost level is associated with a minimum amplification length, a maximum amplification length, an amplitude adjustment setting, and an amplitude adjustment ratio. For each boost level, the CAPTCHA module 120 can determine the number of times to boost the amplitude of the corresponding file. This can be accomplished by multiplying the boost level's amplitude adjustment ratio with the length of the file (in seconds, for example). The CAPTCHA module 120 can randomly select a starting frame within the file to start the boosting process and a length for boosting the amplitude. The randomly-selected length can be between the minimum amplification length and the maximum amplification length. The CAPTCHA module 120 can determine the amount of amplitude adjustment for each boost by multiplying the amplitude adjustment setting with the normalized version of the target sound file. The normalized version of the sound file can be generated by normalizing the data in the file to values between 0 and 1.

In various embodiments, the minimum amplification length can be in the form of a comma-delimited string of integers representing the minimum length to amplify an audio signal corresponding to a boost level at each amplification interval. The minimum amplification length can be about 250 milliseconds. The maximum amplification length can be in the form of a comma-delimited string of integers representing the maximum length to amplify an audio signal corresponding to a boost level at each amplification interval. The maximum amplification length can be about 500 milliseconds. The amplitude adjustment setting can be a comma-delimited string of doubles representing a scaling factor for adjusting the amplitude of an audio signal corresponding to a boost level. The default value can be about 0.8 or 1.2. The amplitude adjustment ratio can be a comma-delimited string of doubles representing the ratio (times per second) to apply the amplitude adjustment setting for each boost level. In addition, the amplitude adjustment ratio can be multiplied by the length of the audio file to determine how many times to apply the particular boost level. The amplitude adjustment ratio can be about 0.95.

The processes of FIGS. 2a and 2b also perform data de-normalization (at steps 150 and 162, respectively). Specifically, prior to outputting an altered sound file, the CAPTCHA module 120 de-normalizes the data in the file. In some embodiments, the CAPTCHA module 120 uses a static scaling constant to perform data de-normalization. For example, the CAPTCHA module 120 multiplies the scaling constant with each element of the normalized data to generate de-normalized data, which is then converted into the appropriate output format.

In various embodiments, the output files of the processes of FIGS. 2a and 2b are in the Microsoft .wav format or G.711μ-law format. The output file format can support one or more of the following options: one (mono) channel, a sample rate of 8000 samples per second, a frame rate of 8000 bytes per second, a frame rate of 1 byte per sample, and an 8-bit sample size.

In various embodiments, the processes of FIGS. 2a and 2b can further include the step of scaling the output files by a certain scaling factor to ensure that the output volume is correct. The scaling factor can be selected from a range of 1 to 2,000,000,000, such as 30,000,000.

In addition to generating altered sound files, the CAPTCHA module 120 can upload the altered sound files to the guardian module 110 in a configurable location to form a library of altered sound files in the guardian module 110. The altered sound files can include both altered digit files, as generated by the process of FIG. 2a, and inter-digit noise files, as generated by the process of FIG. 2b. In some embodiments, before the altered sound files are sent to the guardian module 110, the CAPTCHA module 120 stores the files temporarily in one or more local directories.

In certain embodiments, the CAPTCHA module 120 loads the altered sound files to one or more nodes of the guardian module 110. Each node of the guardian module 110 can be associated with a unique node name, a node address (e.g., an IP address or hostname), a node user name (e.g., the username used when connecting to the node via the SSH File Transfer Protocol (SFTP)), and node password (e.g., the password used when connecting to the node via the SFTP). In addition, a node database stored in the analyzer 108 manages and controls the nodes. When uploading altered sound files to the guardian module 110, the CAPTCHA module 120 first downloads a node record from the node database of the analyzer 108, which includes node names, addresses, usernames, and passwords. Then, the CAPTCHA module 120 uploads the files to the appropriate nodes based on the node record.

File transfer to the guardian module 110 can be performed using SFTP. In some embodiments, a socket timeout period is used when connecting to the guardian module 110. The timeout period can be selected from a range of between 1 millisecond and 60000 milliseconds, such as about 3000 milliseconds (3 seconds).

In some embodiments, the CAPTCHA module 120 assigns a unique identification (ID) to each altered sound file. For example, the altered sound files can be named ".wav," where the string "XXXXX" does not contain any leading 0s and represents a number in one of the following ranges: 1 . . . 99, 300 . . . 899, 1000 . . . 9999, and 10100 . . . 65535. Therefore, this naming convention provides 65,135 available filenames. The value represented by each "XXXXX" is a unique ID of the corresponding altered sound file. In addition, the CAPTCHA module 120 can maintain a mapping of the IDs of the altered sound files to the digit (e.g., number or letter) and the complexity level associated with the files. In some cases, if an altered sound file is an inter-digit noise file, a corresponding complexity level is absent. The CAPTCHA module 120 can upload the mapping to the guardian module 110, the policy server 104 and/or the database 126.

In some embodiments, the CAPTCHA module 120 can periodically refresh the files stored in the guardian module 110. For example, the CAPTCHA module 120 can replace files in the guardian module 110 associated with certain digits and complexity levels with new digit files having the same complexity levels and digits. The refresh interval can be selected from a range of 1 minute (60 seconds) to 20 minutes (1200 seconds), such as every 10 minutes (600 seconds). According to an exemplary refreshment process, the CAPTCHA module 120 first generates one or more new files using the processes of FIGS. 2a and 2b. The CAPTCHA module 120 then determines the IDs of the old files in the guardian module 110 that can be replaced based on the mapping described above. The CAPTCHA module 120 then assigns the IDs of the old files to the corresponding new files and overwrites the old files in place with the new files on the guardian module 110. This process can iterated over each pertinent node in the guardian module 110 to refresh the altered sound files stored on that node.

Examples of Applying CAPTCHA Challenges

Figure 3:
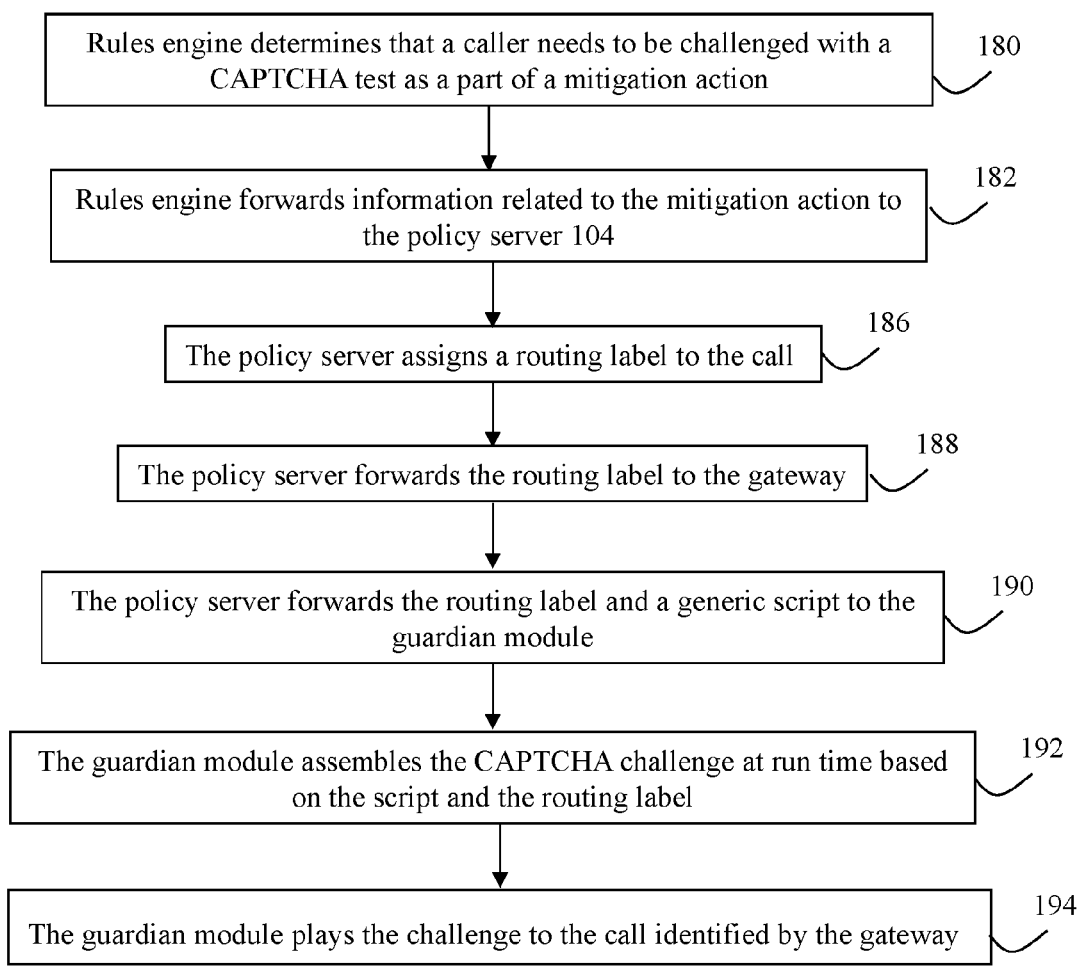
FIG. 3 shows an exemplary process by which a CAPTCHA challenge is administered to a caller.

Using the library of altered sound files, the guardian module 110 can interact with the policy server 104 and the gateway 102 to provide a suitable CAPTCHA test to a caller, who is identified in a mitigation action issued by the rules engine 116. FIG. 3 shows an exemplary process by which a CAPTCHA test is administered to a caller identified by a mitigation action. The process starts when the rules engine 116 determines that the caller can be challenged with a CAPTCHA test as a part of a mitigation action (step 180). The rules engine 116 forwards information related to the mitigation action to the policy server 104 via the PCE 122 and the EMS module 112 (step 182). Information for an exemplary mitigation action for triggering a CAPTCHA challenge can include, for example, the complexity level of the challenge and the identity of the call to which the challenge can be applied.

In response, the policy server 104 assigns a routing label to the call identified by the mitigation action (step 186). The routing label includes one or more parameters defining a CAPTCHA challenge based on the complexity level indicated in the mitigation action. The routing label can also be used to identify the call. The policy server 104 can forward the routing label to the gateway 102 (step 188) to notify the gateway 102 of the caller who requires the service of a CAPTCHA test. In addition, the policy server 104 can forward the routing label, along with a generic script, to the guardian module 110 (step 190). The guardian module 110 then assembles the CAPTCHA challenge at run time by configuring the generic script using the parameters of the routing label corresponding to the call (step 192). In addition, the guardian module 110 plays the challenge to the call identified by the gateway 102 based on the routing label (step 194).

According to the process of FIG. 3, the policy server 104 can assign a routing label to a call identified in the mitigation action (step 186). In various embodiments, the policy server 104 is configured to store one or more routing labels predefined for multiple complexity levels. Each routing label includes a set of parameters used to define a CAPTCHA challenge for the corresponding complexity level. Hence, based on the complexity level associated with a call, the policy server 104 can randomly select a routing label from the predefined routing labels of the same complexity level and assign the selected routing label to the call.

In some embodiments, a routing label for a complexity level defines parameters that are usable by the guardian module 110 to configure one or more variables of a generic script. The parameters include, for example, the minimum number of digits used in a CAPTCHA challenge for that complexity level, the maximum number of digits used in a CAPTCHA challenge for that complexity level, the current minimum number of digits for that complexity level (can be greater than or equal to the minimum number of digits, but less than or equal to the maximum number of digits) and the current maximum number of digits for that complexity level (can be greater than or equal to the minimum number of digits, greater than or equal to the current minimum number of digits, but less than or equal to the maximum number of digits).

The parameters of a routing label can also specify a signal-to-noise ratio for the complexity level to indicate the ratio of undistorted sound signal to background noise in each altered sound file of the CATPCHA challenge. In general, the lower a signal-to-noise ratio, the more noise is in the signal and the higher the complexity level of the sound file. The parameters can specify the noise generation algorithms used to generate noise for the individual digits as well as for the inter-digit time periods in a CAPTCHA challenge corresponding to that complexity level. The parameters can specify one or more locations in the original sound file library from which the altered sound files of a CAPTCHA challenge corresponding to the complexity level should be generated. In addition, the parameters of a routing label can specify a minimum inter-digit delay time period and a maximum inter-digit delay time period.

The policy server 104 can maintain a list of routing labels for each complexity level that are currently assigned to calls requiring CAPTCHA challenges at that complexity level. The policy server 104 can also maintain list of available routing labels for each complexity level, which represents a list of routing labels that are currently available to be assigned by the policy server 104 based on the values for current minimum number of digits and current maximum number of digits. In addition, the policy server 104 can maintain an enabled flag for each complexity level, which may be a Boolean value to indicate whether the complexity level is active. A complexity level can be flagged as active if there is at least one call that requires the service of a CATPCHA challenge at that complexity level.

In various embodiments, the routing labels stored in the policy server 104 can be refreshed on a periodic basis, such as every 10 to 300 seconds (e.g., every 30 seconds). In some examples, the CAPTCHA module 120 can initiate a refresh process by sending a request to the policy sever 104 via the PCE 122 to refresh routing labels associated with one or more active complexity levels (e.g., as determined by the enabled flag for each complexity level). For each assigned routing label of an active complexity level, the refresh process can involve the policy server 104 randomly selecting an available routing label from the list of available routing labels for that complexity level and replacing the assigned routing label with the newly selected routing label.

In some embodiments, the policy server 104 can maintain a mapping of IDs of the altered sound files to their respective complexity levels. The mapping can be generated by the CAPTCHA module 120 and uploaded to both the guardian module 110 and the policy server 104 for storage. The CAPTCHA module 120 can also periodically update the mapping information in the guardian module 110 and/or the policy server 104.

According to the process of FIG. 3, the policy server 104 can send the routing label assigned to a call, along with a generic script, to the guardian module 110 (step 190). The guardian module 110, upon receiving the script and the routing label, can configure the generic script to define a CAPTCHA challenge for the call by using the parameters in the corresponding routing label (step 192). Specifically, the guardian module 110 can customize the generic script by defining various variables of the script in a randomized process subject to the parameters of the routing label. In some embodiments, a certain number of run-time variables, such as twenty six, are configurable by the guardian module 110 to customize the generic script for a specific call.

The variables can include multiple "DIG_XX" variables, with each variable storing the ID of an altered sound file selected for inclusion in the CAPTCHA sequence. The order of the files in the CAPTCHA sequence is represented by the "XX" designation. For example, if there are 4 digits and 3 inter-digit delays in a CAPTCHA sequence, variables DIG00, DIG02, DIG04 and DIG06 identify the altered digit files for the digits and variables DIG01, DIG03, DIG05 identify the inter-digit noise files for the inter-digit delays. These files can be played sequentially by the guardian module 110, with the file corresponding to the DIG0 variable played first and the file corresponding to the DIG05 variable played last. In some embodiments, the guardian module 110 selects the IDs of the altered sound files randomly from a pool of altered sound files with the same complexity level as the complexity level identified in the routing label. The pool of altered sound files with the same complexity level can be determined from a mapping of sound file IDs to their respective complexity levels that is generated and updated by the CAPTCHA module 120. In addition to the complexity level specified by the routing label, selection of each altered sound file is subject to other parameters of the routing label, such as whether a male or female voice or a language accent should be used. In some embodiments, the altered sound files identified by the "DIG_XX" variables are stored in the guardian module 110 such that the guardian module 110, upon receiving the generic script and the routing label from the policy server 104, can choose the appropriate altered sound files for playback to a caller based on the values of the "DIG_XX" variables defined for the script.

The variables of the generic script can also include ENTER_CHALLENGE_MSG_ID, which specifies the ID of a sound file that plays an instruction message, such as "Please enter the following digits. Press 1 followed by the # sign to repeat the instructions." The variables can include ATTEMPTS, which sets the number of attempts/retries a caller can make before a CAPTCHA challenge is marked as "failed," and CHALLENGE, which sets the number of digits for the CAPTCHA challenge. The variables can include FINAL_TREATMENT, which defines a final treatment option if the caller fails the CAPTCHA test. For example, if FINAL_TREATMENT is set to 1, it means terminate the call with announcement, if FINAL_TREATMENT is set to 2, it means route the call as dialed, and if FINAL_TREATMENT is set to 3, it means route the call to an IVR by populating a DESTINATION variable. In some embodiments, the DESTINATION variable stores the telephone number of an IVR Platform or recording platform to route the call if the caller fails the CAPTCHA challenge. In addition, the variables can include CMPX, which is the complexity level of the challenge to be logged in a call's CDR for statistical maintenance purposes.

The variables of the generic script can also include GREETING_MSG_ID, which specifies the ID of the sound file for playing a greeting message. The greeting message is generally the first message a caller hears before the CAPTCHA test is applied, such as "Welcome." The variables can include INVLD_ATMPT_MSG_ID, which stores the ID of a sound file when an invalid attempt or response is made by the caller, such as when the caller enters a value that doesn't match one or more of the digits played in the challenge.

In addition, the variables of the generic script can include TOTL_DIG_TO, which specifies the timeout period for a user to respond to the challenge before the challenged is marked as "failed." In some embodiments, the TOTL_DIG_TO variable is set to the default value of 15 seconds. The variables can include TOTL_SESSION_TIMER, which specifies the total timeout period for playing the challenge and collecting a caller's response.

Furthermore, the variables of the generic script include REPLAY_LIMIT, which specifies a CAPTCHA challenge replay limit. For example, a caller can press 1# to replay a challenge. In some embodiments, the REPLAY_LIMIT variable is set to a default value, such as "4444," to imply that replays are permitted until the TOTL_SESSION_TIMER expires. The variables can include SKIP_LIMIT, which specifies the number of skip attempts allowed. In some embodiments, the SKIP_LIMIT variable is set to a default value, such as 0, to imply that no skipping is allowed. The variables can include SKIP_MSG_ID, which stores the ID of a sound file that is used to notify a caller that he can skip to a next challenge. For example, the message can state that if the caller wants to skip to a next challenge, he can press a specific key, such as 1. If the caller fails to enter 1, the default is to play the original challenge again.

The guardian module 110 can customize the generic script by defining the run-time variables using a randomized process while subject to the parameters of the routing label. For example, the script can be configured to specify the number of digits to be included in a challenge of a certain complexity. The number of digits can be randomly determined between the minimum number of digits and the maximum number of digits defined by the routing label.

The script can be configured to include an inter-digit delay period for a challenge that is associated with the specific complexity level. The duration of the inter-digit delay can be randomly selected between the minimum inter-digit delay period and the maximum inter-digit delay period defined by the routing label. In some embodiments, the script can be configured to specify a background noise level associated with the inter-digit delay such that, during the delay period, background noise of the specified level is played to the caller. The background noise level can be selected from variable background noise levels defined by the routing label.

Furthermore, the script can be configured, based on the parameters in the routing label, to specify a digit collection timeout period for a challenge, which is the amount of time a caller has to respond to the challenge before the challenge is marked as "failed." The script can be configured to specify a limit for incorrect caller responses before the challenge is marked as "failed." The script can be configured to include a session timeout period, which specifies the total amount of time a challenge/response session is allowed to last before being declared "failed."

In various embodiments, the script can be configured, based on the parameters in the routing label, to specify whether a CAPTCHA challenge can be replayed to a caller and the number of replay attempts that can be made by the caller before the challenge is marked as "failed." The script can be configured to specify whether a caller is allowed to skip a CAPTCHA challenge that is, for example, not "recognizable" or too complex, and the number of skip attempts that can be made by the caller before the challenge is marked as "failed."

In various embodiments, a script can be configured, based on the parameters in the routing label, to indicate various actions that can be taken after a CAPTCHA challenge has been administered to a caller. For example, the script can be configured to indicate that one or more fields of a call's CDR need to be marked to uniquely identify whether the call has passed or failed the challenge. The script can be configured to indicate that a call's CDR needs to include value(s) identifying the primary CAPTCHA challenge and any subsequent skipped challenges. The script can be configured to indicate that a call's CDR needs to track the number of attempts made by the caller prior to skipping to the next challenge. In general, by including instructions in one or more scripts to track the number of CAPTCHA failures and/or successes via the corresponding CDRs, up-to-date statistical data can be maintained.

In various embodiments, a script can be configured, based on the parameters in the routing label, to specify one or more auxiliary sound files to be played to a caller, for example, at the start of a CAPTCHA challenge session (e.g., a greeting message), when the caller skips to a next challenge if the skip option is enabled, at the conclusion of a CAPTCHA challenge session if the caller passed the challenge, and/or at the conclusion of a CAPTCHA challenge session if the caller failed the challenge.

In various embodiments, the script can be configured, based on the parameters in the routing label, to recommend one or more final treatments if a caller fails a CAPTCHA challenge. Exemplary treatments include terminating the call without further processing, routing the call normally to the called party, re-routing the call to an IVR, and/or re-routing the call to a call center to receive recorded messages. These final treatment options can be similar to the mitigation actions available to the rules engine 116.

Figure 4:
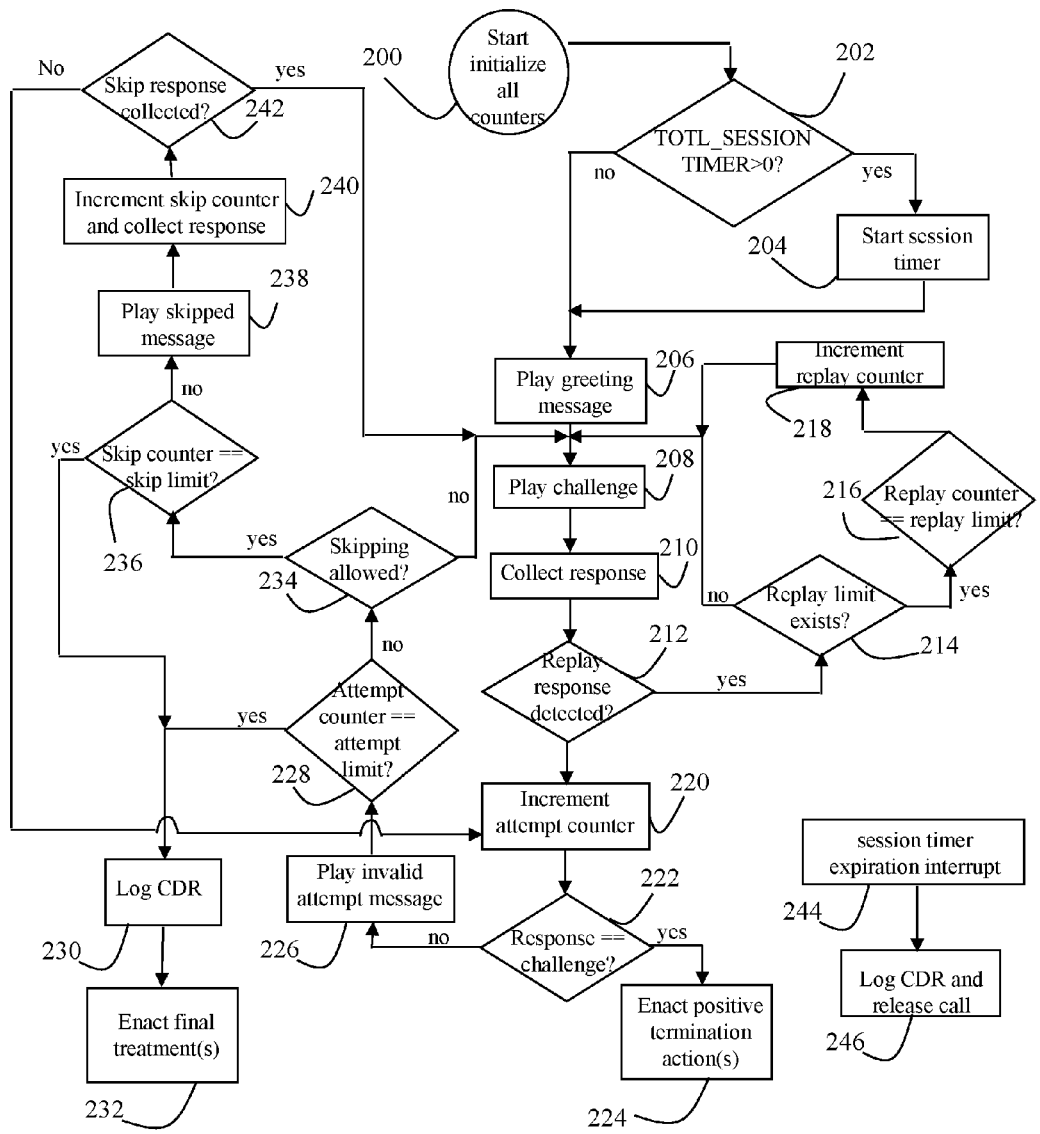
FIG. 4 shows an exemplary process for administering a CAPTCHA challenge to a caller.

According to the process of FIG. 3, the guardian module 110 can play a CAPTCHA challenge to the caller identified by the gateway 102 (step 194) based on a script configured by the guardian module 110 during run time (step 192). FIG. 4 shows an exemplary process of the guardian module 110 for administering a CAPTCHA challenge to a caller based on a configured script.

The process starts with the guardian module 110 initializing all pertinent counters prior to presenting the challenge to a caller (step 200). The guardian module 110 then determines if the TOTL_SESSION_TIMER variable defined by the configured script is greater than 0 (step 202), which indicates that the script has provided a timeout period for playing the challenge and collecting a caller's response. If this is the case, the guardian module 110 initiates a timer for keeping track of the duration of the session (step 204). If the timer for the current session exceeds the TOTL_SESSION_TIMER parameter, the guardian module 110 generates a session timer expiration interrupt (step 244), which in turn triggers various actions, including logging the event in the CDR of the call and release the call (step 246).

The guardian module 110 then plays a greeting message to the caller (step 206) to inform the caller, for example, that the caller can press #1 to replay the challenge. The greeting message can be retrieved by the guardian module 110 using the message ID defined by the GREETING_MSG_ID variable of the configured script. Following the greeting message, the guardian module 110 plays the challenge message, which includes a sequence of digits and/or inter-digit noise, to the caller (step 208) and the caller's response is collected (step 210). The guardian module 110 can fetch each altered sound file corresponding to the digit or inter-digit noise in the CAPTCHA challenge sequence based on the ID of the altered sound file defined by the DIG_XX variables in the configured script.

If the caller chooses to replay the challenge (step 212), such as by pressing "1#" as indicated in the greeting message, the guardian module 110 proceeds to determine whether there is a limit on the number of replays allowed (step 214). The limit can be defined by the REPLAY_LIMIT variable of the configured script. If there is no limit on the number of times the caller can replay a challenge, the process proceeds to play the same challenge message (step 210). If there is a limit, the process determines whether the REPLAY_LIMIT has been reached by comparing a replay counter with the REPLAY_LIMIT (step 216). If the REPLAY_LIMIT is not reached, the guardian module 110 increments the replay counter by 1 (step 218) and replays the challenge message to the user (step 208). Otherwise, the guardian module 110 proceeds to increment an attempt counter by 1 (220) without replaying the challenge message. The attempt counter keeps track of the number of challenge messages played to a caller before the caller provides a correct response.

The guardian module 110 also determines whether the response collected from the caller matches the digits played in the challenge (step 222). If the response is correct, the guardian module 110 can take one or more positive termination actions (step 224), such as marking the CDR of the call to reflect the successful CAPTCHA test result, playing a concluding message to the caller and/or routing the call to its intended destination. If the response is incorrect, however, the guardian module 110 plays a suitable message to the caller to inform him that his response is incorrect (step 226). IDs for the "pass" or "fail" concluding messages can be defined by specific variables in the script file, which allow the guardian module 110 to fetch them during run time of the CAPTCHA challenge.

For each incorrect caller response, the guardian module 110 further determines whether the caller can be given a new CAPTCHA challenge (step 228) by, for example, comparing the attempt counter with an ATTEMPT_LIMIT variable defined by the configured script. If the attempt counter is equal to the ATTEMPT_LIMIT, the guardian module 110 does not play another challenge to the caller, but instead marks the CDR corresponding to the call to reflect the failed test result (step 230) and provides one or more final treatments to the caller (step 232). The final treatments can be defined by the FINAL_TREATMENT variable of the configured script. If, however, the ATTEMPT_LIMIT is not reached (step 228), the guardian module 110 proceeds to determine whether skipping is allowed (step 234), such as determining if SKIP_LIMIT of the configured script is set to 0. The SKIP_LIMIT specifies the limit on the number of skip attempts allowed for a caller and can be set to 0 if skipping is not allowed. If no skipping is allowed and the number of attempts thus far have not exceeded the ATTEMPT_LIMIT (step 228), the guardian module 110 can play the same challenge to the caller (step 208).

If skipping is allowed, the guardian module 110 determines whether a skip counter, which keeps tracks of the number of skip attempts made by the caller, has reached the SKIP_LIMIT (step 236). If this limit is reached, this means that the caller cannot be challenged with any more CAPTCHA tests. Hence, the guardian module 110 logs the CDR of the call as "failed" (step 230) and enacts one or more final treatments defined by the FINAL_TREATMENT variable of the configured script (step 232). However, if the SKIP_LIMIT has not been reached, the guardian module 110 can play a skip message to the caller informing the caller that he can skip a challenge by pressing, for example, "1" to skip (step 238). The skip message can be fetched by the guardian module 110 during run time based on the ID of the message stored in the SKIP_MSG_ID variable of the configured script. The guardian module 110 then increments the skip counter by 1 and collects a response from the caller indicating whether he wants to skip the challenge (step 240). If the user chooses to skip the current challenge, the guardian module 110 can play a new challenge to the caller (step 208). If the user does not choose to skip the current challenge, the guardian module 110 increments the attempt counter by 1 (step 220).

The above-described techniques can be implemented in digital and/or analog electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of generating an altered sound file for a digit that corresponds to a number or a letter, the method comprising:
    receiving a complexity level and an input audio file comprising original clear voice sound of the digit;
    converting data in the input audio file into normalized digit data;
    generating normalized background noise using a noise generation algorithm;
    adding the normalized background noise to the normalized digit data to generate combined data, the amount of background noise added being based on the complexity level;
    de-normalizing the combined data to produce the altered sound file for the digit; and
    playing the altered sound file for a digit that corresponds to a number or letter to a caller as part of an audio challenge-response test to mitigate a possible network attack by the call.

2. The method of claim 1 wherein the normalized digit data comprises normalized linear pulse-code modulation data.

3. The method of claim 1 wherein the noise generation algorithm produces at least one of additive white Gaussian noise or pre-recorded background noise.

4. The method of claim 1 wherein the amount of background noise added is based on a signal-to-noise ratio defined for the complexity level.

5. The method of claim 4 wherein said complexity level is determined based on an alarm corresponding to an incoming call indicative of a network attack.

6. The method of claim 4 further comprising receiving, by a server, information related to a mitigation action for a Voice-Over-IP (VoIP) call, the mitigation action being generated by an analyzer based on detecting a possible network attack by the call, the information including said complexity level for administering said audio challenge-response test to the call.

7. The method of claim 1 further comprising adding one or more random bits of silence to the combined data.

8. A method of generating an inter-digit noise file, the method comprising:
    generating normalized background noise using a noise generation algorithm;
    adding one or more random bits of silence to the normalized background noise;
    adding one or more random bits of amplitude variation to the normalized background noise;
    de-normalizing the normalized background noise to produce the inter-digit noise file; and
    playing the inter-digit noise file to a caller as part of an audio challenge-response test to mitigate a possible network attack by the call.

9. The method of claim 8 wherein the noise generation algorithm produces at least one of additive white Gaussian noise or pre-recorded background noise.

10. The method of claim 9 further comprising:
    receiving a complexity level; and
    wherein the amount of background noise added is based on a signal-to-noise ratio defined for the complexity level.

11. The method of claim 10 wherein the pre-recorded background noise is airport or restaurant noise.

12. The method of claim 10 further comprising receiving, by a server, information related to a mitigation action for a Voice-Over-IP (VoIP) call, the mitigation action being generated by an analyzer based on detecting a possible network attack by the call, the information including said complexity level, said complexity level being for administering said audio challenge-response test to the call.

13. A computer program product, tangibly embodied in a non-transitory computer readable medium, for generating an altered sound file for a digit that corresponds to a number or a letter, the computer program product including instructions being operable to cause data processing apparatus to:
    receive a complexity level and an input audio file comprising original clear voice sound of the digit;
    convert data in the input audio file into normalized digit data;

generate normalized background noise using a noise generation algorithm;
add the normalized background noise to the normalized digit data to generate combined data, the amount of background noise added is based on the complexity level;
de-normalize the combined data to produce the altered sound file for the digit; and
play the altered sound file for a digit that corresponds to a number or letter to a caller as part of an audio challenge-response test to mitigate a possible network attack by the call.

\* \* \* \* \*